United States Patent [19]

Bingham

[11] E Patent Number: Re. 32,840

[45] Reissued Date of Patent: Jan. 24, 1989

[54] LIQUID SPRAY JET ASSEMBLY AND A MINERAL MINING MACHINE CUTTING HEAD INCORPORATING SUCH ASSEMBLY

[75] Inventor: Garrick R. Bingham, Fishlake, Near Doncaster, England

[73] Assignee: Green & Bingham Limited, Doncaster, England

[21] Appl. No.: 424,646

[22] Filed: Sep. 27, 1982

Related U.S. Patent Documents

Reissue of:

[64] Patent No.: 4,199,107
Issued: Apr. 22, 1980
Appl. No.: 910,672
Filed: May 30, 1978

[30] Foreign Application Priority Data

Jun. 9, 1977 [GB] United Kingdom ..... 24089/77

[51] Int. Cl.[4] ..... B05B 1/00
[52] U.S. Cl. ..... 239/600; 239/596
[58] Field of Search ..... 239/596, 600, 587

[56] References Cited

U.S. PATENT DOCUMENTS

| | | | |
|---|---|---|---|
| 2,660,473 | 11/1953 | Hansen | 239/587 X |
| 2,990,980 | 7/1961 | Gronemeyer | 239/587 X |
| 3,129,777 | 4/1964 | Haspert | 239/600 X |
| 3,705,693 | 12/1972 | Franz | 239/600 |
| 3,711,031 | 1/1973 | Ewald | 239/596 X |
| 3,722,798 | 3/1973 | Bletcher | 239/428.5 |
| 3,753,597 | 8/1973 | French | 239/600 X |
| 3,799,453 | 3/1974 | Hart | 239/600 |
| 3,827,637 | 8/1974 | Stephany | 239/600 X |
| 3,854,665 | 12/1974 | Rodgers | 239/600 X |
| 3,876,253 | 4/1975 | Parker | 239/600 X |
| 3,997,116 | 12/1976 | Moen | 239/460 |
| 4,058,261 | 11/1977 | Pollart | 239/600 X |

FOREIGN PATENT DOCUMENTS

| | | |
|---|---|---|
| 1219414 | 3/1963 | Fed. Rep. of Germany . |
| 447043 | 5/1936 | United Kingdom . |
| 625070 | 6/1949 | United Kingdom . |
| 686923 | 2/1953 | United Kingdom . |
| 851883 | 10/1960 | United Kingdom . |
| 919040 | 2/1963 | United Kingdom . |
| 1022576 | 3/1966 | United Kingdom . |
| 1271196 | 4/1972 | United Kingdom . |
| 1462664 | 1/1977 | United Kingdom . |
| 1515965 | 6/1978 | United Kingdom . |

*Primary Examiner*—Richard A. Schacher
*Attorney, Agent, or Firm*—Henry Sternberg; Bert Lewen

[57] ABSTRACT

A liquid spray jet assembly is disclosed destined particularly for use in dust and debris laden conditions such as on the cutting heads of mineral mining machines. The assembly comprises a housing for securing to a piece of apparatus, a jet which is a push fit into the interior of the housing and a resilient seating between the jet and a part of the housing. The seating is made from a compressible material and is so compressed by the jet when positioned in the housing that the restoring force causes part of the jet to bear against a surface of the housing facing towards the seating so holding the jet within the housing. The housing and the jet have communicating passages for the passage of liquid therethrough. Use of a push fit avoids the previously used screw threaded communications and makes jet replacement an extremely simple operation.

10 Claims, 5 Drawing Sheets

LIQUID SPRAY JET ASSEMBLY AND A MINERAL MINING MACHINE CUTTING HEAD INCORPORATING SUCH ASSEMBLY

Matter enclosed in heavy brackets [ ] appears in the original patent but forms no part of this reissue specification; matter printed in italics indicates the additions made by reissue.

This invention relates to liquid spray jet assemblies, and particularly to such assemblies for use in dust and debris laden conditions. One particular application within the field of the invention is cutting heads for mineral mining machines, such cutting heads being equipped with liquid spray jet assemblies.

Many forms of liquid spray jet assemblies are known. Those destined for use in heavy industry, and particularly in the mining industry usually comprise jets removably mounted on a jet holder which is in turn secured to the piece of equipment that is to be equipped with the jets. One particular application of such jets is on cutting heads for mineral mining machines, for example coal cutting heads, which have a plurality of pick boxes mounted around their circumference, each pick box being capable of retaining a pick which actually performs the cutting action on the coal face or other face being worked. It is a requirement in modern mining that dust be kept to a minimum, and to assist in this it is customary for cutting heads to incorporate means for spraying water on to each pick or on to the cut mineral. To achieve this [is] *it* is customary for the cutting head to be formed with a so-called water gallery through which water is fed to a plurality of channels, each channel terminating at its outer end at a region of the cutting head on which a jet is mounted.

Due to the rigorous conditions of service of such equipment, replacement of jets is necessary at frequent intervals, and such replacements present problems on existing equipment, where the jet assembly generally relies on a threaded connection between the jet and the holder. Such connections become clogged with debris and the combination of this debris with water can give a cementing effect that holds the jet very tightly in the holder and makes replacement of the jet extremely difficult.

According to the present invention a liquid spray jet assembly [for securing to a piece of apparatus] comprises [a housing for securing to the piece of apparatus, a jet fitted to the housing, retaining means for retaining the jet on the housing, and communicating passages through the housing and the jet for the passage of liquid therethrough, in which the jet is a push fit into the interior of the housing and a resilient seating is provided between the jet and a part of the housing, the seating being made from a compressible material and being so compressed by the jet when positioned in the housing that the restoring force causes part of the jet to bear against a surface of the housing facing towards the seating, said surface at least partially constituting the retaining means, and to be held thereby within the housing.] *a rigid housing designed to be secured to a piece of apparatus, the housing having a passage opening into a chamber therein, a resilient seating within the chamber, a jet releasably fitted within the housing and having a passage therethrough communicating with the passage into the housing for the passage of liquid therethrough, in which the housing and the jet are so shaped that a retaining part of the jet is insertable into and removable from the chamber through an opening in the housing, the opening having opposed retaining sections the distance between which is less than a corresponding dimension of the retaining part of the jet, the resilient seating being made from a compressible material that is deformable during insertion of the retaining part to allow the retaining part to be located partially beneath the opposed retaining sections, in which position the seating is compressed by the jet and the restoring force due to such compression biases the jet to engage the retaining part beneath the opposed sections thereby to hold the jet in position within the housing and effects a seal that directs liquid from the housing passage into the jet passage, and the seating further being deformable to allow removal of the jet from the housing through the opening therein.*

The invention thus provides a jet that can be readily fitted into and removed from the housing [due to the push fit arrangement,] *through the opening,* and that does not suffer so greatly from jamming due to the effect of the debris and water. The compression of the seating as the jet is fitted [into] *to* the housing ensures a tight fit of the jet and acts to force the jet against the retaining means. Furthermore the seal [between] *formed by* the seating [and the jet and between the jet and the retaining means] ensures a watertight passage from the housing to the jet so that water supplied to the jet through the *passage into the* housing will pass through the jet and will not leak to any substantial degree around the jet.

Preferably *stop* means are provided for limiting movement of the *retaining part of the* jet away from the [surface of the housing that forms the retaining means] *opposed retaining sections* to a distance such that the resilient seating is not fully compressed. Particularly when they are used on cutting heads the jets are subjected to large back pressures tending to force them into the housing and the presence of such stop means prevents damage resulting therefrom.

According to a further feature of the invention a cutting head for a mineral mining machine having a plurality of pick boxes has, secured to the head, a plurality of liquid spray jet assemblies as hereinbefore stated.

The cutting head may be of the cylindrical type, in which case the jet assemblies will generally be disposed around the circumference of the head, or may be of the plough type. In either type, jet assemblies may be mounted adjacent to the pick boxes to direct liquid forwards or in advance of the picks, or may be mounted in other locations on the [heand] *head.*

Embodiments of jet assemblies according to the invention will now be described, by way of example only, with reference to the accompanying drawings in which.

Figure 1:
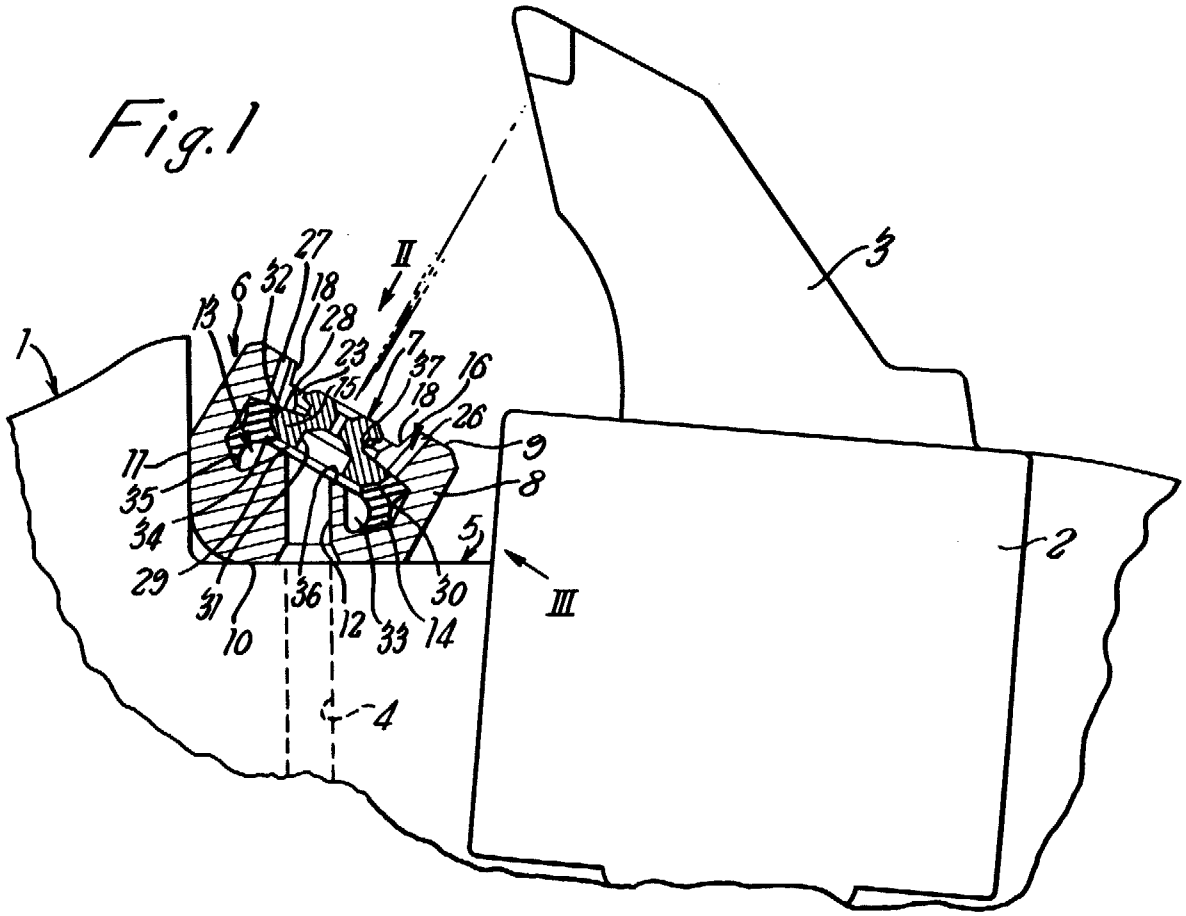
FIG. 1 is an axial cross section through a first embodiment of jet assembly, showing the assembly schematically in position on a coal cutting head.

Referring first to FIG. 1, this shows part of a cylindrical coal cutting head 1 which carries around its circumference a number of pick boxes such as 2 in each of which a pick 3 is removably mounted in known manner. The cutting head incorporates a water gallery (not shown) which is fed by water through a hollow shaft for the cutting head and which in turn feeds the water into a series of radially extending channels such as 4, one associated with each pick box. Each channel 4 terminates at its radially outer end in a jet assembly receiving region 5 in which is welded a housing 6 in which is fitted a jet 7 mounted so as to direct a spray of water onto the leading face of the pick.

The housing 6 of the jet assembly has a generally cylindrical wall section 8 terminating in an axially outer plane surface 9 and in plane surfaces 10 and 11 which locate the housing in the receiving region 5. The housing is formed with a passage 12 which, when the housing is properly positioned in the region 5, lies in axial alignment with the radially extending water channel 4 through the cutting head.

The passage 12 opens into a chamber 13 within the housing, and located within the chamber 13 are an annular resilient seating member 14 and *a retaining part 15 of* the jet 7 which is a push fit into the chamber through [a passageway 16] *an* opening *16* into the plane face 9 and co-axial with the chamber.

Figure 2:
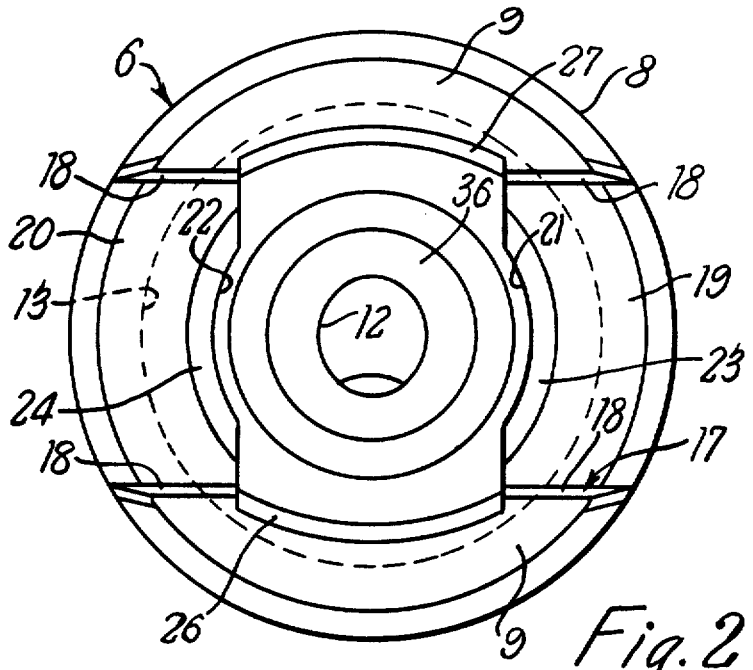
FIG. 2 is an enlarged plan view of the assembly of FIG. 1 taken in the direction of the arrow II of FIG. 1.

The [passageway] *opening 16* has the shape best seen from FIG. 2. A shallow channel 17 is formed across the surface 9, the channel having side walls 18 which taper inwardly towards a plane including the axis of the housing. The base of the channel provides two flat faces 19 and 20 each perpendicular to the axis of the chamber and each terminating at opposite sides of an opening into the chamber. Part of the line of termination of each face is arcuate as at 21 and 22 respectively, and each face is chamfered around its arcuate termination to form walls 23 and 24 of the passageway which taper inwardly towards the chamber. *The diameter of the opposed sections 21 and 22 is less than the maximum diameter of the retaining body 15 of the jet.* The axially inner surfaces of these parts 19 and 20 form retaining means such as 25 facing towards the seating 14 housed within the chamber. The other walls of the [passageway] *opening* 16 leading into the chamber are formed by arcuate surfaces 26 and 27 of those parts of the housing which stand above the channel 17 and have the plane surfaces 9. The arcuate surfaces 26 and 27 are also chamfered and taper inwardly towards the chamber.

The jet 7 has a *retaining* body 15 having an axially outer face 28 and an axially inner face 29 joined by a circumferential face 30 which tapers inwardly towards the axially inner face. The jet is formed with a passage 31 of convergent-divergent shape and when the jet is in position as shown in FIG. 1 the passage 31 communicates with the passage 12 through the housing and the seating member 14 surrounds the region of communication of the two passages.

The *retaining body 15 of the* jet 7 is fitted into the housing through the [passageway] *opening* 16 by sliding the [jet] *body* in over the lip formed by surface 24 so that the axially outer face 28 engages under the lip formed by surface 23 and the axially inner and circumferential surfaces 29 and 30 of the [jet] *body* engage a face 32 of the seating member. Forcing the jet towards the seating member causes both axial and radial compression of this to an extent such that the face 28 can be moved axially past the lip formed by surface 24 and the jet is then forced by the resilience of the seating into the position shown in FIG. 1 where [it] *the retaining body* engages beneath the surfaces 25. The resilience of the seating holds the [jet] *body 15* against the surfaces 25 and the jet is thereby retained in position in the housing.

In use, when high pressure water is supplied to the jet assembly, pressure is applied to the seating member in the region 33 of the chamber. This causes a lip 34 of the seating member to seal against the axially inner face 29 of the jet and the pressure also causes the [jet] *body 15* to seat firmly against the surfaces 25. The pressure in the part 33 of the chamber also causes a lip 35 of the seating ring to seal against the wall of the chamber. This double sealing effect defines a substantially leak-proof channel and the water can only pass through the passage 31 in the jet to be sprayed therefrom, rather than leaking around the sides of the jet.

It will be noted that the section of the housing which defines the passage 12 through the housing projects into the chamber formed within the housing and terminates adjacent to the axially inner wall 29 of the jet when correctly positioned in the housing. If any excessive back pressure is applied to the jet while working in a coal cutting operation it will be seen that the axially inner face 29 of the [jet] *body 15* contacts the annular surface 36 formed at the end of the passage 12 and thus prevents the jet from being pushed into the housing to an extent such that the seating 14 is fully compressed and the locating and sealing effect lost.

When it is required to remove the jet in order to replace this, it is merely necessary to engage a suitable tool with a part of the jet to prise the [jet] *body 15* away from the lip formed by surface 23 and over the lip formed by surface 24 and then guide the jet axially out through the [passageway] *opening* 16. This action can be carried out very quickly and easily, despite the presence of debris around the jet.

Figure 4:
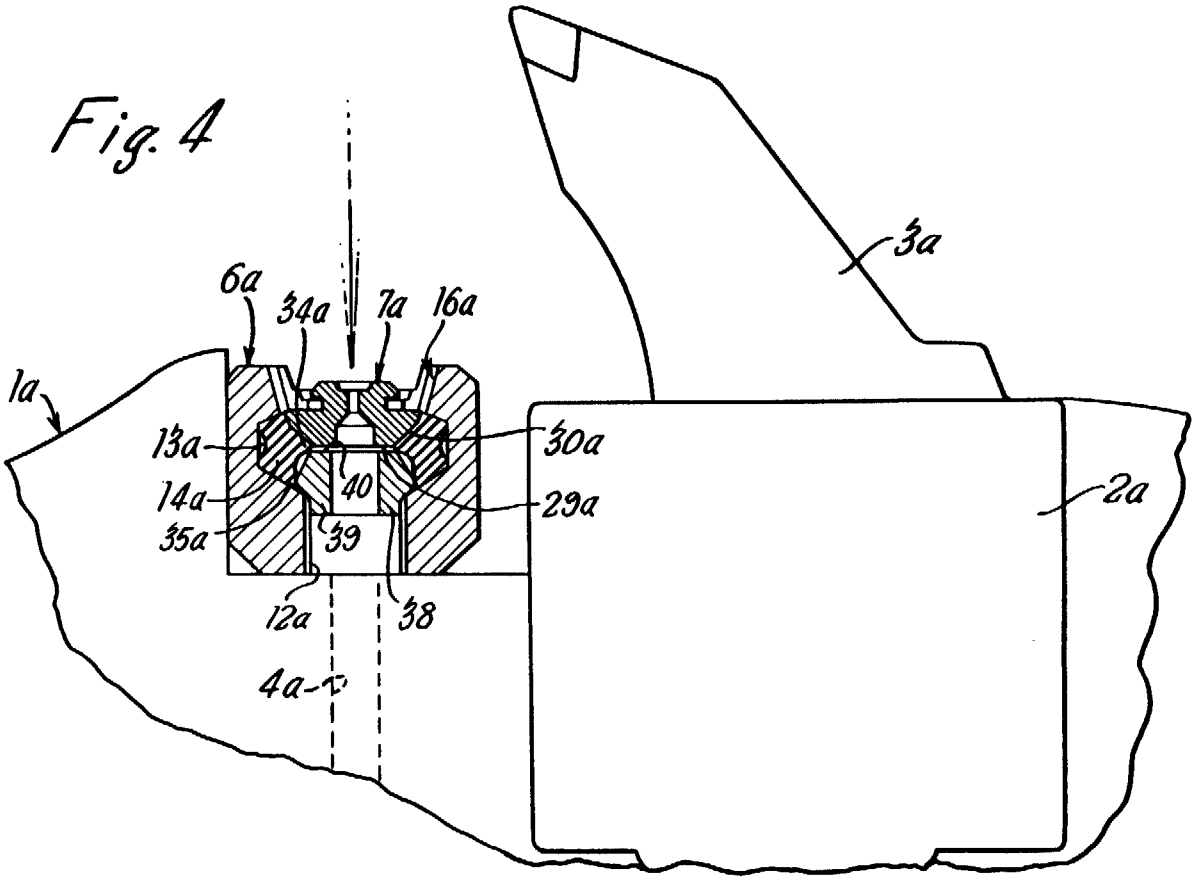
FIG. 4 is an axial cross section through a second embodiment of jet assembly, again shown schematically in position on a coal cutting head.

Referring now to FIG. 4 this shows a modified jet assembly for securing to a coal cutting head in a manner such that the jet is co-axial with the water channel 4a through the head and directs a water jet in advance of the pick 3a and on to the cut coal rather than on to the tip of the pick. As the jet assembly shown in FIG. 4 is in many respects similar to that in FIG. 1 corresponding parts are given the same reference numbers as used in FIG. 1, together with the suffix a. The jet 7a is shaped almost identically to that shown in FIG. 1, as is the [passageway] *opening* 16a into the chamber 13a within the housing and the [jet] *body* is fitted into and removed from the housing in exactly the same manner as described with reference to FIG. 1. The resilient annular seating 14a is again shaped as shown in FIG. 1 and has lips 34a and 35a which seat respectively against the circumferential wall 30a of the [jet] *body* and against the wall of the chamber to provide a double seal when water pressure is applied. The jet assembly shown in FIG. 4 includes a separate backstop element 38 located within the chamber and having a stem 39 which fits within the passage 12a through the housing. The backstop 39 has an axial face 40 which is adjacent to the axially inner face 29a of the jet and limits the distance that the jet can move into the chamber under back pressure applied during working. Thus, the jet cannot move so far that the seating is fully compressed and the location and sealing effect lost.

In situations where no great back pressure is experienced the back-stop 39 may be omitted, the jet being held in place by the seating 14a.

Figure 5:
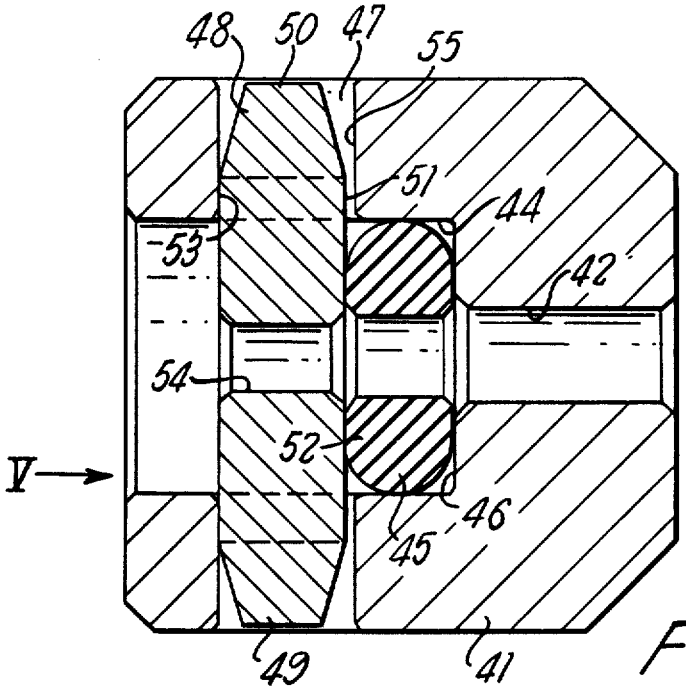
FIG. 5 is an axial cross section through a third embodiment.
Figure 6:
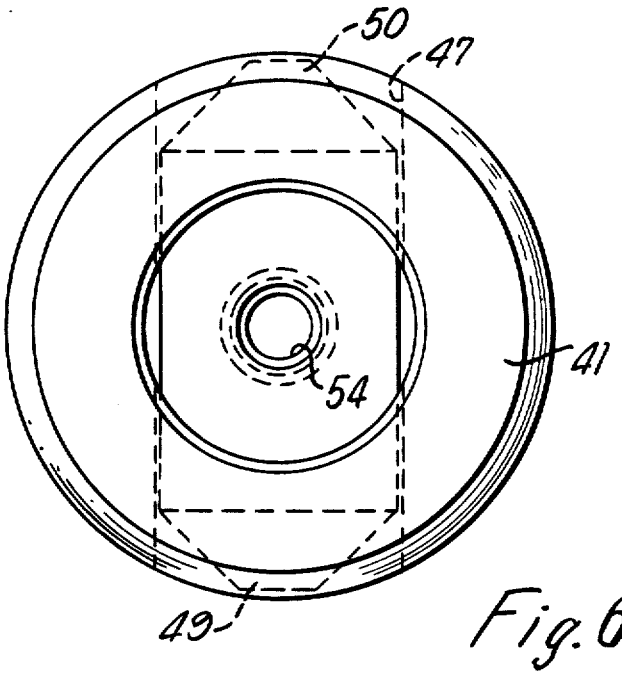
FIG. 6 is an elevation on the arrow V of FIG. 5.

Referring now to FIGS. 5 and 6 these show a jet assembly comprising a housing 41 having an axial passageway 42.

Figure 3:
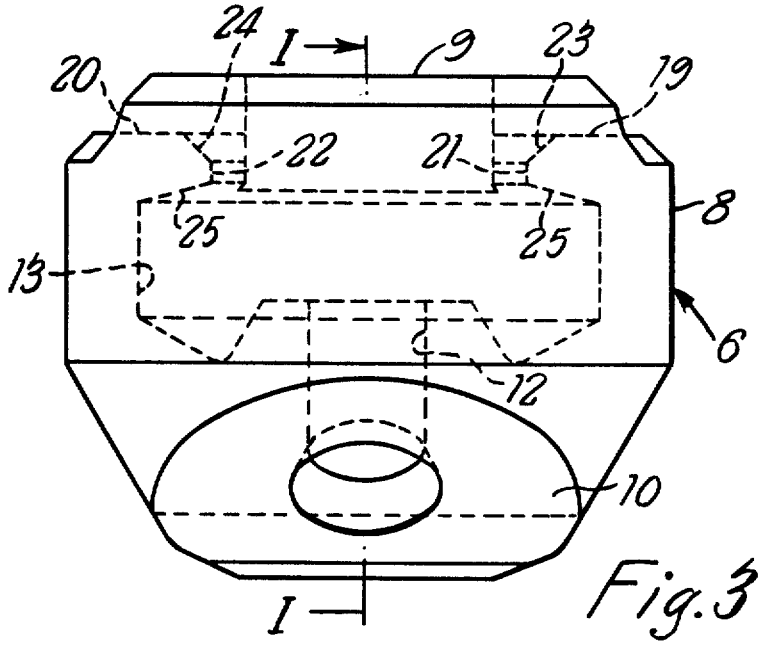
FIG. 3 is an enlarged elevation taken in the direction of the arrow III in FIG. 1.

The bore has an enlarged section 44 extending to the axially outer end of the housing and an annular resilient seating member 45 is positioned in the enlarged section 44 to lie against the step 46 formed between the enlarged section 44 and the remainder of the passageway 42. A diametrical opening 47 is formed through the housing to intersect the enlarged section of the passageway and a jet 48 is a push-fit into the opening 47. The jet is formed with tapered ends 49 and 50 so that as the jet is pushed into the opening from one end thereof the respective tapered end engages the seating member and axially compresses this against the step 46. When the jet is in its proper fitted position within the housing as shown in FIG. 3 it will be seen that an axial face 51 of the jet bears against an adjacent axial face 52 of the seating member and that the resilience of the compressed seating member forces the jet 48 against that surface 53 of the opening 47 which faces towards the seating member so retaining the jet in the housing. The jet is formed with an axial jet passage 54 which is then axially aligned with the hole through the seating member 45 and with the passageway 42. Thus, when water under pressure is applied to the passageway 42 this causes the seating member to be further compressed against the jet and the jet to be pressed firmly against the surface 53. The presence of the resilient seating member thus ensures a substantially leak-free passage through the assembly. The surface 55 of the opening 47 acts as a stop for limiting movement of the jet away from the surface 53, so that the seating member 45 cannot be fully compressed.

To replace the jet this is pushed from the opening 47 in either direction and is not seriously impeded by any dust which may be present. In order to fit and remove the jet in this arrangement it will usually be necessary to employ a hammer to push the jet into the fitted position and to remove it from the housing.

Figure 7:
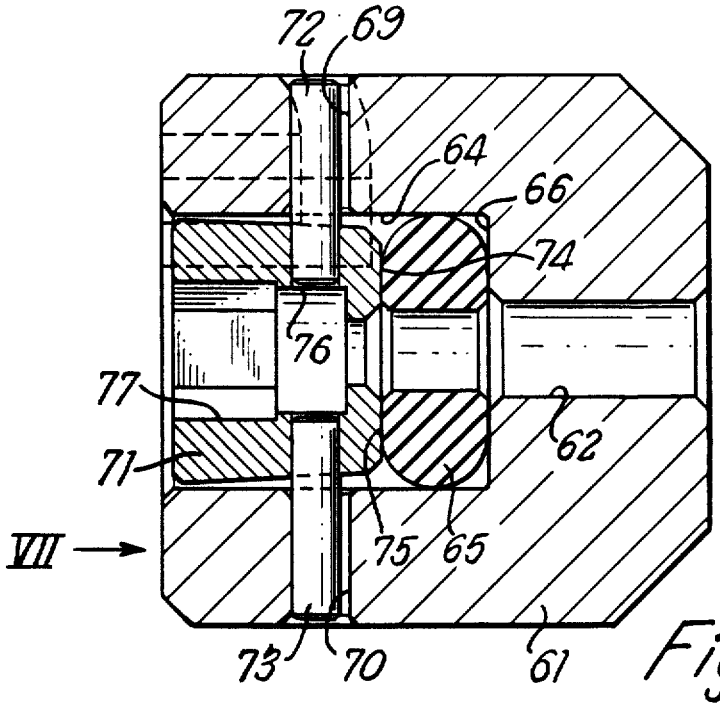
FIG. 7 is a longitudinal cross section of a fourth embodiment.
Figure 8:
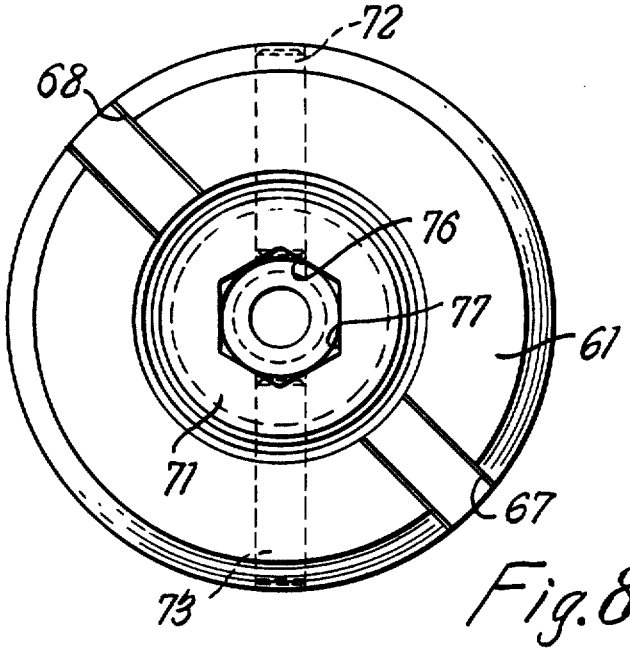
FIG. 8 is an elevation on the arrow VII of FIG. 7.

The jet assembly shown in FIGS. 7 and 8 again comprises a housing 61 having an axial passageway 62. The passageway has an enlarged section 64 and an annular resilient seating member 65 formed between sections 62 and 64. The enlarged section 64 opens into the axially outer end of the housing and slots 67 and 68 project radially from the section and lead into undercut sections 69 and 70 to form a bayonet-type connection.

A jet 71 is formed with radially projecting bayonet pins 72 and 73 which can pass axially through the slots 67 and 68 and then can be turned through a small angle to lock in the undercut parts 69 and 70 so that the jet is firmly held within the housing. In this fitted position an axially inner face 74 of the jet engages an axially outer face 75 of the seating member 65 and causes compression of the seating member. Thus, when water under pressure is supplied to the passageway 62 this is guided through the seating member 65 into a jet passage 76 through the jet, the connection being substantially leak-free. The jet may be replaced by twisting and axially removing it from the position shown in FIG. 7, without substantial hindrance from debris. The twisting action is conveniently effected by inserting an Allen key into a hexagonal end section 77 of the jet passage through the jet.

The jets shown in FIGS. 5 to 8 may readily be fitted to a coal cutting head in a manner similar to that shown in FIG. 4, the passage through the jet being co-axial with the water passage through the cutting head. Clearly, however, the housings shown in FIGS. 5 and 7 may be modified so that the jet may be mounted as shown in FIG. 1 with the jet directed towards the top of the pick.

It is not necessary for any of the jets described to be used with a coal cutting head and they may be used with cutting heads for other minerals or in a multiplicity of other operations where the jet is required to operate in a dusty environment. Specific examples of such other uses are on other forms of coal and mineral cutting and handling equipment, on sprays for conveyor belts handling cut minerals and for jets in fire sprinkler systems for use in mines. Other uses will readily be apparent to one skilled in the art.

Clearly there are other ways in which a jet can be fitted into a housing with a press fit type of action and will seat against a resilient seating member. All such assemblies fall within the general scope of this invention.

The actual form of the bore through the jet may be designed as required to meet particular conditions, and may include therein a pin or other insert.

I claim:

[1. A liquid spray jet assembly comprising a rigid housing designed to be secured to a piece of apparatus, a jet fitted within the housing, retaining means for releasably retaining the jet within the housing, and communicating passages through the housing and the jet for the passage of liquid therethrough, in which the housing and jet are so shaped that the jet is a push fit into the housing through an opening therein and is removable from the housing through said opening, and a resilient seating is provided between the jet and a part of the housing, the seating being made from a compressible material that deforms to allow fitting and removal of the jet and that is so compressed by the jet when positioned in the housing that the restoring force due to such compression causes part of the jet to be forced towards a surface of the housing facing towards the seating, said surface at least partially constituting the retaining means, and to be held thereby in position within the housing.]

[2. A liquid spray jet assembly according to claim 1 in which stop means are provided for limiting movement of the jet away from the surface of the housing that forms the retaining means to a distance such that the resilient seating is not fully compressed.]

[3. A liquid spray jet assembly according to claim 1 in which a chamber is formed within the housing for receiving the jet and the seating, and the seating is in the form of an annular member surrounding the region of communication of the passages through the housing and the jet and shaped so that when liquid under pressure is supplied through the passage in the housing the annular member seals against the jet and against the wall of the chamber.]

[4. A liquid spray jet assembly according to claim 3 in which the jet is a push fit into the chamber through a passageway co-axial with and smaller than the chamber, and the surface of the housing that forms the retaining means is part of that face of the chamber where the passageway opens into the chamber and transverse to the axis of the chamber.]

[5. A liquid spray jet assembly according to claim 4 in which the walls of the passageway taper inwardly towards the chamber, and part of the jet has an axially outer face, an axially inner face and a circumferential face joining the axially outer and inner faces and tapering inwardly towards the axially inner face.]

[6. A cutting head for a mineral mining machine having a plurality of pick boxes, and having secured to the head, at least one liquid spray jet assembly comprising a rigid housing secured to the head, a jet fitted within the housing, retaining means for retaining the jet within the housing, and communicating passages through the housing and the jet for the passage of liquid therethrough, in which the housing and jet are so shaped that the jet is a push fit into the housing through an opening therein and is removable from the housing through the opening, and a resilient seating is provided between the jet and a part of the housing, the seating being made from a compressible material that deforms to allow fitting and removal of the jet and that is so compressed by the jet when positioned in the housing that the restoring force due to such compression causes part of the jet to be forced towards a surface of the housing facing towards the seating, said surface at least partially constituting the retaining means, and to be held thereby in position within the housing.]

[7. A cutting head according to claim 6 in which stop means are provided for limiting movement of the jet away from the surface of the housing that forms the retaining means to a distance such that the resilient seating is not fully compressed.]

[8. A cutting head according to claim 6 in which a chamber is formed within the housing for receiving the jet and the seating, and the seating is in the form of an annular member surrounding the region of communication of the passages through the housing and the jet and shaped so that when liquid under pressure is supplied through the passage in the housing the annular member seals against the jet and against the wall of the chamber.]

[9. A cutting head according to claim 8 in which the jet is a push fit into the chamber through a passageway co-axial with and smaller than the chamber, and the surface of the housing that forms the retaining means is part of that face of the chamber where the passageway opens into the chamber and transverse to the axis of the chamber.]

[10. A cutting head according to claim 9 in which the walls of the passageway taper inwardly towards the chamber, and part of the jet has an axially outer face, an axially inner face and a circumferential face joining the axially outer and inner faces and tapering inwardly towards the axially inner face.]

*11. A liquid spray jet assembly comprising a rigid housing designed to be secured to a piece of apparatus, the housing have a passage opening into a chamber therein, a resilient seating within the chamber, a jet releasably fitted within the housing, the jet having an imaginary centerline and having a retaining part having opposed retaining portions and having a passage therethrough communicating with the passage into the housing for the passage of liquid therethrough, in which the housing and the jet are so shaped that the jet is a push fit into the housing through an opening therein and is removable from the chamber through said opening in the housing, the opening having a centerline and having opposed retaining sections the distance between which is less than a corresponding dimension of said opposed retaining portions of said retaining part of the jet, the resilient seating being made from a compressible material that is deformable to such extent during insertion of the jet to allow the jet to be angularly tilted with respect to said center line of said opening to allow one of said retaining portions to be moved under the corresponding one of said retaining sections and then allow the other of said retaining portions to be moved past said other of said retaining sections so that said retaining part is located partially beneath the opposed retaining sections, in which position the seating is compressed by the jet and the restoring force due to such compression biases the jet to engage the retaining part beneath the opposed retaining sections, such engagement being the sole region of engagement between the jet and the housing, thereby to hold the jet in position within the housing and effect a seal that directs liquid from the housing passage into the jet passage, and the seating further being deformable to allow tilting movement of the jet for disengagement within said region and removal of the jet from the housing through the opening therein, said tilting movements for engagement and disengagement being such as to cause the centerline of the jet to be angularly displaced with respect to the centerline of said opening within a plane containing both said centerlines.*

*12. A liquid spray jet assembly according to claim 11 in which stop means are provided for limiting movement of the retaining part of the jet away from the opposed retaining sections to a distance such that the resilient seating is not fully compressed.*

*13. A liquid spray jet assembly according to claim 11 in which the resilient seating is so shaped that when liquid under pressure is supplied through the housing, part of the seating effects a seal communicating the two passages and part effects a seal against the wall of the chamber.*

*14. A liquid spray jet assembly according to claim 11 in which the chamber and the retaining part of the jet are substantially circular in cross-section, the seating member is annular, and the opposed sections of the opening are diametrically opposed arcuate sections co-axial with the chamber and with a diameter less than the maximum diameter of the retaining part of the jet.*

*15. A liquid spray jet assembly according to claim 11 in which the opening has walls which taper inwardly towards the chamber, and the retaining part of the jet has an axially outer face, an axially inner face and a circumferential face joining the axially outer and inner faces and tapering inwardly towards the axially inner face.*

*16. A cutting head for a mineral mining machine having a plurality of pick boxes and having secured to the head at least one liquid spray jet assembly, comprising a rigid housing secured to the head, the housing having a passage opening into a chamber therein, a resilient seating within the chamber, a jet releasably fitted within the housing, the jet having an imaginary centerline and having a retaining part having opposed retaining portions and having a passage therethrough communicating with the passage into the housing for the passage of liquid therethrough, in which the housing and the jet are so shaped that the jet is a push fit into the housing through an opening therein and is removable from the chamber through said opening in the housing, the opening having a centerline and having opposed retaining sections the distance between which is less than a corresponding dimension of said opposed retaining portions of said retaining part of the jet, the resilient seating being made from a compressible material that is deformable to such extent during insertion of the jet to allow the jet to be angularly tilted with respect to said center line of said opening to allow one of the retaining portions to be moved under the corresponding one of said retaining sections and*

*then allow the other of said retaining portions to be moved past said other of said retaining sections so that said retaining part is located partially beneath the opposed retaining sections, in which position the seating is compressed by the jet and the restoring force due to such compression biases the jet to engage the retaining part beneath the opposed retaining sections, such engagement being the sole region of engagement between the jet and the housing, thereby to hold the jet in position within the housing and effect a seal that directs liquid from the housing passage into the jet passage, and the seating further being deformable to allow tilting movement of the jet for disengagement within said region and removal of the jet from the housing through the opening therein, said tilting movement for engagement and disengagement being such as to cause the centerline of the jet to be angularly displaced with respect to the centerline of said opening within a plane containing both said centerlines.*

*17. A cutting head according to claim 16 in which stop means are provided for limiting movement of the retaining part of the jet away from the opposed retaining sections to a distance such that the resilient seating is not fully compressed.*

*18. A cutting head according to claim 16 in which the resilient seating is so shaped that when liquid under pressure is supplied through the housing, part of the seating effects a seal communicating the two passages and part effects a seal against the wall of the chamber.*

*19. A cutting head according to claim 16 in which the chamber and the retaining part of the jet are substantially circular in cross-section, the seating member is annular, and the opposed sections of the opening are diametrically opposed arcuate sections co-axial with the chamber and with a diameter less than the maximum diameter of the retaining part of the jet.*

*20. A cutting head according to claim 16 in which the opening has walls which taper inwardly towards the chamber, and the retaining part of the jet has an axially outer face, an axially inner face and a circumferential face joining the axially outer and inner faces and tapering inwardly towards the axially inner face.*

* * * * *